United States Patent
Chen et al.

(10) Patent No.: US 9,164,552 B2
(45) Date of Patent: Oct. 20, 2015

(54) REAL TIME VISUALIZATION OF NETWORK INFORMATION

(71) Applicant: Futurewei Technologies, Co., Plano, TX (US)

(72) Inventors: Yunxia Chen, Fremont, CA (US); Kenneth Durazzo, San Ramon, CA (US); An Ho, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 160 days.

(21) Appl. No.: 13/629,244

(22) Filed: Sep. 27, 2012

(65) Prior Publication Data

US 2014/0089810 A1 Mar. 27, 2014

(51) Int. Cl.
*G06F 3/00* (2006.01)
*G06F 1/16* (2006.01)
*G06F 3/048* (2013.01)
*H04L 12/24* (2006.01)
(Continued)

(52) U.S. Cl.
CPC .............. *G06F 1/1686* (2013.01); *G06F 3/011* (2013.01); *G06F 3/048* (2013.01); *G06T 19/006* (2013.01); *H04L 41/14* (2013.01); *H04L 41/22* (2013.01); *H04L 41/5009* (2013.01)

(58) Field of Classification Search
CPC ............................ H04L 12/1831; G06F 3/048
USPC ......................................................... 715/738
See application file for complete search history.

(56) References Cited

U.S. PATENT DOCUMENTS

| 8,184,068 | B1 | 5/2012 | Rhodes et al. | |
|---|---|---|---|---|
| 8,417,000 | B1* | 4/2013 | Mendis | 382/118 |
| 2003/0080992 | A1* | 5/2003 | Haines | 345/734 |

(Continued)

FOREIGN PATENT DOCUMENTS

| CN | 101448123 A | 6/2009 |
|---|---|---|
| CN | 102216941 A | 10/2011 |
| CN | 102436662 A | 5/2012 |

OTHER PUBLICATIONS

Foreign Communication From a Counterpart Application, PCT Application No. PCT/CN2013/085030, International Search Report dated Jan. 16, 2014, 6 pages.

(Continued)

*Primary Examiner* — Tadeese Hailu
*Assistant Examiner* — Andrew Chung
(74) *Attorney, Agent, or Firm* — Conley Rose P.C.; Grant Rodolph; Brandt D. Howell (57) ABSTRACT

A user equipment (UE) comprising a display, a visual input configured to capture motion or stop photography as visual data, a receiver configured to receive network data associated with a network element (NE) from a server, and a processor coupled to the display, visual input, and receiver and configured to receive visual data from the visual input, receive the network data from the server via the receiver, overlay the network data on the visual data to create composite image, and transmit the composite image to the display. Also disclosed is a network comprising a server configured to store network data in memory, wherein the network data comprises the physical location of a plurality of NEs in the network, receive field of view data from a UE, wherein the field of view data defines the field of view of a visual input of the UE, and transmit to the UE a network data response message comprising the network data for each NE physically located in the UE visual input's field of view.

11 Claims, 4 Drawing Sheets

(51) Int. Cl.
*G06T 19/00* (2011.01)
*G06F 3/01* (2006.01)

(56) References Cited

U.S. PATENT DOCUMENTS

| | | |
|---|---|---|
| 2006/0190812 A1* | 8/2006 | Ellenby et al. ............... 715/512 |
| 2009/0141180 A1 | 6/2009 | Kondo et al. |
| 2010/0030892 A1* | 2/2010 | Jeong et al. ................... 709/224 |
| 2010/0048242 A1 | 2/2010 | Rhoads et al. |
| 2011/0217962 A1 | 9/2011 | Leung |
| 2011/0238751 A1 | 9/2011 | Belimpasakis et al. |
| 2012/0147040 A1* | 6/2012 | Yun ................................ 345/633 |
| 2012/0205436 A1* | 8/2012 | Thomas et al. ............... 235/375 |
| 2013/0097562 A1* | 4/2013 | Kermoian et al. ............ 715/841 |
| 2013/0132865 A1* | 5/2013 | Li .................................. 715/758 |
| 2013/0185673 A1* | 7/2013 | Cai et al. ....................... 715/790 |
| 2013/0223684 A1* | 8/2013 | Townend et al. .............. 382/103 |
| 2013/0250358 A1* | 9/2013 | Suzuki ......................... 358/1.15 |

OTHER PUBLICATIONS

Foreign Communication From a Counterpart Application, PCT Application No. PCT/CN2013/085030, Written Opinion dated Jan. 16, 2014, 5 pages.

* cited by examiner

REAL TIME VISUALIZATION OF NETWORK INFORMATION

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In order to perform network layout planning, optimization, and maintenance, network technicians may be required to locate and ascertain the status of the network's components. This process may become problematic in situations where the network comprises many components, the technician is unfamiliar with the facility that houses the network, network components are obscured from view, and/or network components are not clearly labeled. These problems may be exacerbated by the utilization of mobile network elements that may be moved around the facility by other users. Such mobile network elements may not remain in predictable locations and may be difficult to locate on demand.

SUMMARY

In one embodiment, the disclosure includes a user equipment (UE) comprising a display, a visual input configured to capture motion or stop photography as visual data, a receiver configured to receive network data associated with a network element (NE) from a server, and a processor coupled to the display, visual input, and receiver and configured to receive visual data from the visual input, receive the network data from the server via the receiver, overlay the network data on the visual data to create composite image, and transmit the composite image to the display.

In another embodiment, the disclosure includes a network comprising a server configured to store network data in memory, wherein the network data comprises the physical location of a plurality of NEs in the network, receive field of view data from a UE, wherein the field of view data defines the field of view of a visual input of the UE, and transmit to the UE a network data response message comprising the network data for each NE physically located in the UE visual input's field of view.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a system and method for displaying the physical location and connectivity status of NEs in real time. A user may employ a UE that comprises a visual input, such as a camera, a display, and position sensors. The UE may determine the UE's present physical location, for example, by using global positioning sensors and/or wireless signal triangulation. The UE may also determine the height, horizontal facing, and/or vertical facing of the UE's visual input, for example, by using magnetometers, gyroscopes, accelerometers, etc. The UE may determine the field of view of the UE's visual input based on the UE's physical location, height, and/or facing and transmit associated field of view data to a server along with a corresponding request for network data. The server may subsequently transmit responsive network data comprising the physical locations and/or connectivity statuses of NEs in proximity to the UE. The UE may determine the locations and/or statuses of the NEs based on the network data, overlay the network data onto visual data from the visual input to create composite images, and display the composite images to the user. The user may point the UE in any given direction and view, in real time, the composite images showing the room/area as seen by the UE/user with an overlay of the physical location and/or connectivity status of any NE in the UE visual input's field of view.

Figure 1:
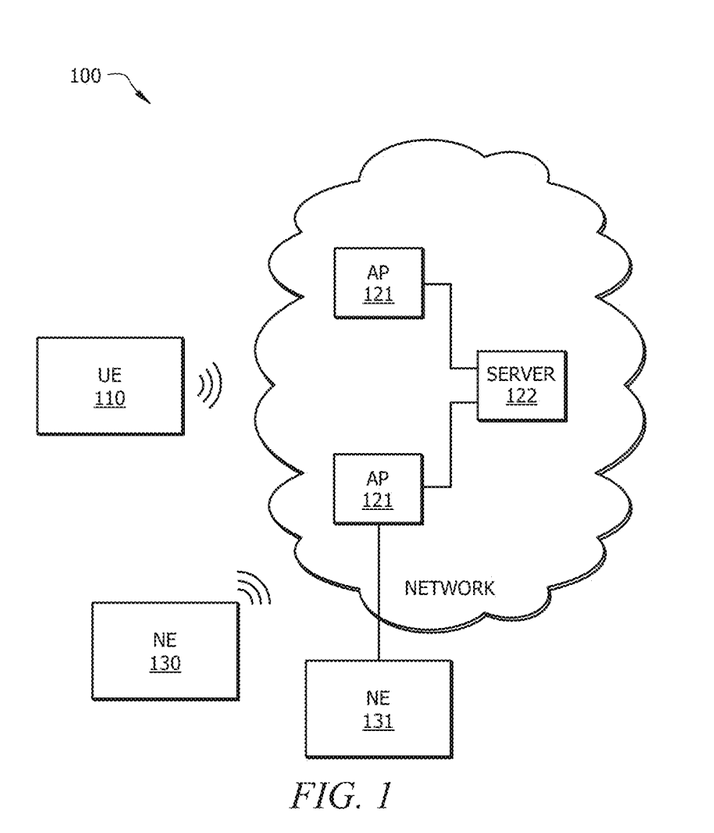
FIG. 1 is a schematic diagram of a network architecture for supporting network data visualization by a UE.

FIG. 1 is a schematic diagram of a network architecture 100 for supporting network data visualization by a UE 110. The network 100 may comprise a server 122 connected to NEs 130-131 via access points (APs) 121. The UE 110 and NEs 130-131 may connect to the server 122 via the APs 121 via wired (e.g NE 131) or wireless (e.g. NE 130) communication.

The NEs 130-131 may comprise UEs, servers, and/or other components of the network 100. NE's 130-131 may support the connectivity of UEs to the network 100 and/or to the Internet (e.g. via the network 100). NE 131 may connect to an AP 121 via a wired connection, while NE 130 may connect to an AP 121 via a wireless connection. As a wired device, the physical location of NE 131 may remain relatively constant while the physical location of wireless NE 130 may change over time based on user movement. The NEs 130-131 and/or APs 121 may be assigned Ethernet internet protocol (IP) addresses, subnet masks, and/or other identifying connectivity information to support network communication. Each NE/AP may further comprise ports and/or interfaces which may be designated by the NE/AP and/or network and employed to connect to the other network components via wired links, wireless connections, etc.

The IP addresses, connectivity information, port designations, interface designations, and/or link information may be collected by the server 122 and stored as network data. Network data may be any data related to a network component and/or element. For example, network data may comprise the physical location of a NE at a specified time, the connectivity status of a NE at a specified time, NE status information, etc. The server 122 may also collect, calculate, and/or store as network data the physical locations of the NE's 130-131 and/or APs 121 at a specified time (e.g. via Global Positioning Sensors (GPS) sensors installed in the NEs 130-131, triangulation based on network signals, etc.) The server may update the network data that comprises the physical location of a NE (e.g. wireless NE 130) as the NE is moved by a user (e.g. the physical location changes) in the normal course of operation. Such updates may be event based and/or periodic. In addition or in the alternative, the server 122 may store key performance indicators (KPIs) associated with the NEs 130-131, APs 121, and/or related links as network data. KPI's may encompass a broad range of indicators and/or metrics that are designed to indicate the connectivity status of an NE 130-131. As a non-limiting example, KPI's may include device availability, interface availability, link availability, bandwidth usage, link performance, data latency, quality of service (QoS) statistics, packet loss, device health, routing statistics, device uptime, etc. KPI's may also vary based on network implementation and may be customized to indicate various aspects of NE and/or network health.

UE 110 may be employed by a user, such as a network technician. The user may point the visual input of UE 110 in various directions. The UE 110 may transmit field of view data that defines the field of view of the visual input to the server 122. Field of view data may comprise the physical location, horizontal facing, vertical facing, and/or height of the UE 110 and/or of a connected visual input at a specified time. The field of view data may further comprise an angular field of view associated with the UE's 110 visual input. The server 122 may transmit network data to the UE 110. The UE 110 may obtain visual data captured by the UE's 110 visual input and display it on the UE's 110 display. When the network data indicates that a NE 130-131 is physically located in the field of view of the UE's 110 visual input, the network data associated with such NE 130-131 may be overlayed on the visual data to create a composite image. The composite image may then be displayed to the user. The composite image may show the user the physical location of NE's 130-131 from the user's and/or UE's 110 perspective with associated network data. This may allow the user to 'see' the NE 130-131 in the physical space even if the NE 130-131 is obscured from view (e.g. is in a drawer, behind a wall, etc.) The user may also request specific types of network data associated with the NE 130-131 in the field of view be displayed (e.g. IP address, specific KPI's, etc.)

For example, the visual input of a UE 110 may comprise a video camera. A user may point the video camera at an object or structure such as a wall, a desk, a ceiling, etc. If a NE (e.g. NE 130-131, AP 121, etc.) is located behind the object, the video camera of the UE 110 may not record the NE (e.g. as visual data) because the NE is obscured from view. However, the network data associated with the NE may indicate the physical location of the NE, which may allow the UE 110 to overlay a representation of the NE and/or the NE's network data onto video recorded by the NE to create a composite image (e.g. a single image or a composite video). The composite image may then be displayed to the user, which may allow the user to see representations of the obscured NE.

Depending on the embodiment, the UE 110 may determine how to overlay the network data onto the visual data or such determination may be made by the server 122. For example, the UE 110 may transmit its physical location and/or a proximity to the server 122. The server 122 may transmit to the UE 110 the network data for all NE's 130-131 with physical locations within the proximity specified by the UE 100. The UE 110 may then overlay the network data in real time based on the changing orientation of the UE 110. As another example, the UE 110 may transmit all of the UE's 110 field of view data to the server 122. The server 122 may then determine which NEs 130-131 and/or network data should be displayed by the UE 110 and/or how such NEs 130-131 and/or network data should be displayed. The server 122 may then continuously transmit the appropriate network data to the UE 110 accounting for UE 110 movement.

Figure 2:
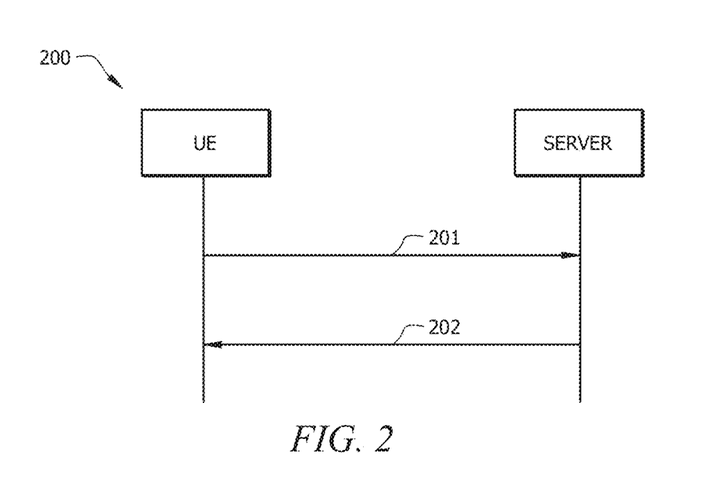
FIG. 2 is a protocol diagram of an embodiment of a method transmitting network data between a UE and a server.

FIG. 2 is a protocol diagram of an embodiment of a method 200 of transmitting network data between a UE and a server, for example UE 110 and/or server 122. The UE may transmit a network data request message 201 to the server. The network data request message 201 may comprise field of view data (e.g. a UE physical location and/or all field of view data necessary to calculate the UE's field of view) and/or a request for a type of network data (e.g. IP addresses, specific KPI's, etc.) The type of network data may be specified by the user (e.g. via UE input). The server may then transmit a network data response message 202 to the UE that comprises the network data requested by the network data request message 201. The network data response message 202 may comprise all of the network data of the requested type associated with NE's within a predetermined and/or specified proximity of the UE, in which case the UE may be required to store all of the responsive network data and dynamically determine which network data to display at a given time (e.g. based on the field of view data). The proximity may be specified by user of the UE and transmitted to the server as part of the network data request message 201. Alternatively, the network data response message 202 may comprise only the network data associated with NEs in the UE's field of view at a specified time, in which case the server may be required to determine which NEs are in the UE's field of view based on the field of view data in network data request message 201.

Figure 3:
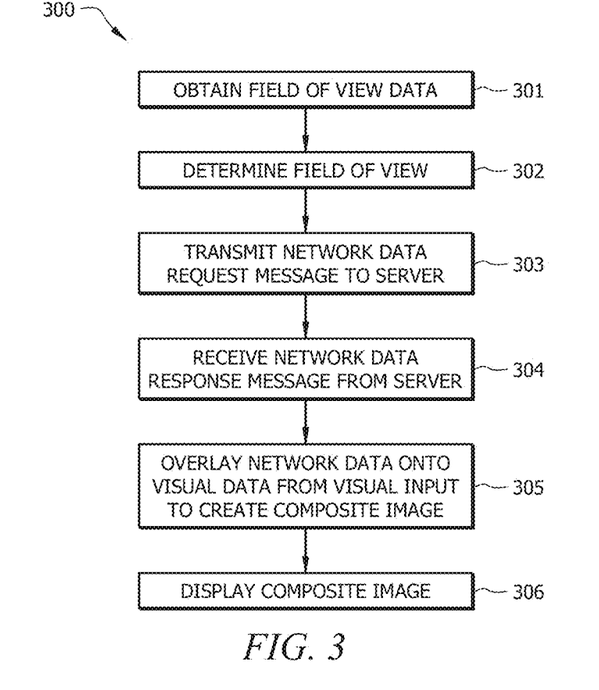
FIG. 3 is a flowchart of an embodiment of a method of overlaying network data onto visual data.

FIG. 3 is a flowchart of an embodiment of a method 300 of overlaying network data onto visual data, for example by a UE such as UE 110. In block 301, the UE may obtain field of view data, for example from the UE's position sensors, and proceed to block 302. At block 302, the UE may determine the current field of view of the UE's visual input based on the field of view data obtained at block 301. The UE may proceed to block 303 and transmit a network data request message to a server. The network data request message may comprise the field of view data and/or a request for a type of network data, which may be received by the UE via user input. At block 304, the UE may receive a network data response message from the server that comprises the network data requested at block 303. The UE may proceed to block 305, may obtain visual data from the visual input, and may overlay the network data on the visual data to create a composite image or images. If the network data response message comprises network data for all NEs in proximity to the UE, the UE may determine which network data to employ and where to position the network data during the overlay process based on the field of view data. The UE may then proceed to block 306 and display the composite image or images.

Figure 4:
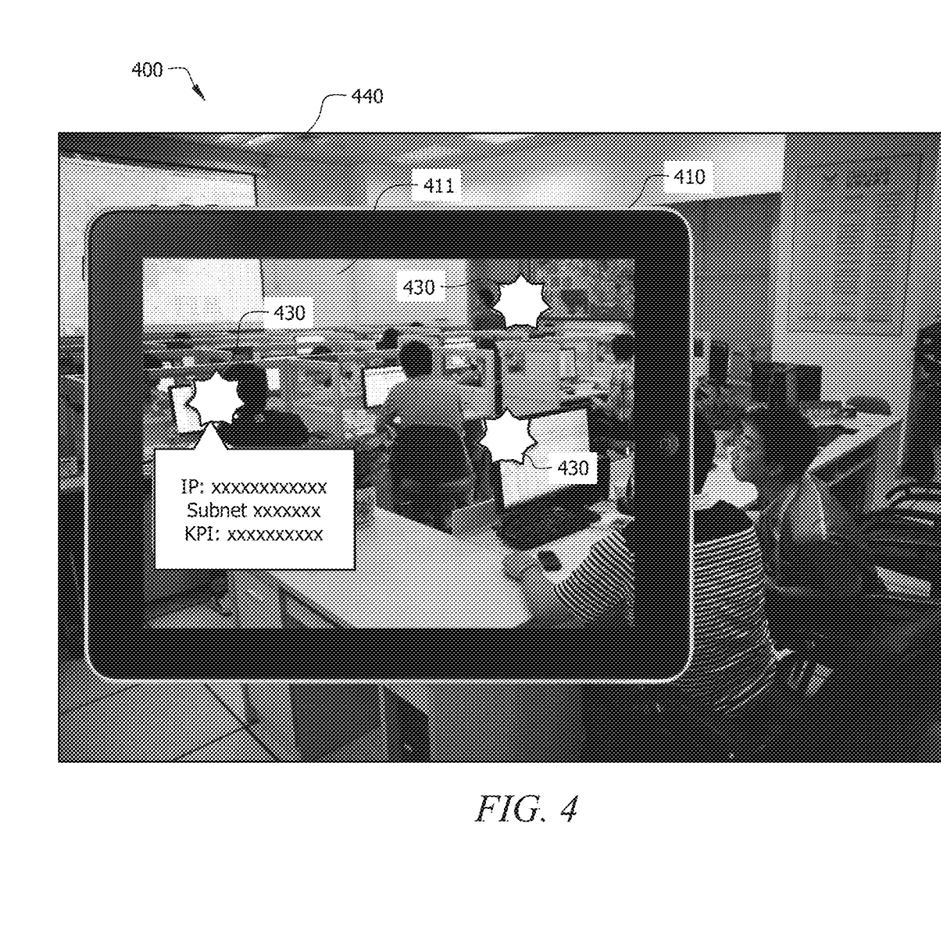
FIG. 4 is an example of a composite image from a user's point of view.

FIG. 4 is an example a composite image 411 from a user's point of view 400, which may be the result of method 300. The UE 410, which may be substantially similar to UE 110, may be positioned by the user in a physical location 440 (e.g. in a room). The UE's 410 visual input may capture an image of the portion of the physical location 440 in the visual input's field of view and display such on the UE's 410 display. The UE may overlay network data 430 for NE's located in visual input's field of view, and display the resulting composite image 411 on the UE's display.

Figure 5:
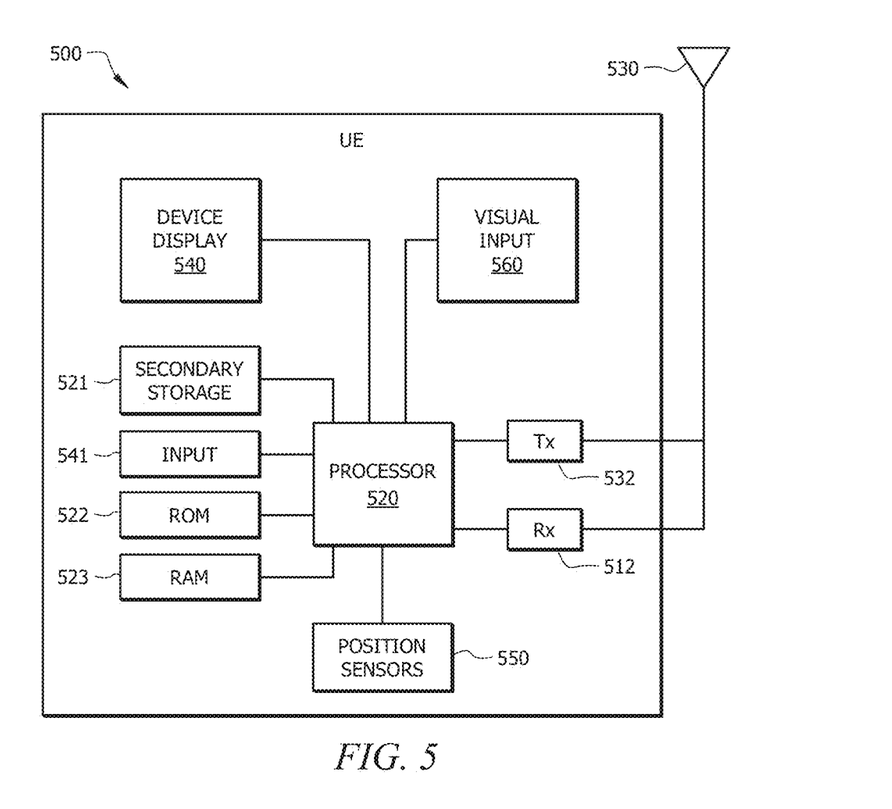
FIG. 5 is a schematic diagram of an embodiment of a UE.

FIG. 5 is a schematic diagram of an embodiment of a UE 500, which may be employed in network 100 (e.g. UE 110). UE 500 may comprise a two-way wireless communication device having voice and/or data communication capabilities. In some aspects, voice communication capabilities are optional. The UE 500 generally has the capability to communicate with other computer systems on the Internet and/or other networks. Depending on the exact functionality provided, the UE 500 may be referred to as a data messaging device, a tablet computer, a two-way pager, a wireless e-mail device, a cellular telephone with data messaging capabilities, a wireless Internet appliance, a wireless device, a smart phone, a mobile device, or a data communication device, as examples.

UE 500 may comprise a processor 520 (which may be referred to as a central processor unit or CPU) that may be in communication with memory devices including secondary storage 521, read only memory (ROM) 522, and random access memory (RAM) 523. The processor 520 may be implemented as one or more CPU chips, one or more cores (e.g., a multi-core processor), or may be part of one or more application specific integrated circuits (ASICs) and/or digital signal processors (DSPs). The processor 520 may be configured to implement any of the schemes described herein, and may be implemented using hardware, software, firmware, or combinations thereof.

The secondary storage 521 may be comprised of one or more solid state drives and/or disk drives which may be used for non-volatile storage of data and as an over-flow data storage device if RAM 523 is not large enough to hold all working data. Secondary storage 521 may be used to store programs that are loaded into RAM 523 when such programs are selected for execution. The ROM 522 may be used to store instructions and perhaps data that are read during program execution. ROM 522 may be a non-volatile memory device may have a small memory capacity relative to the larger memory capacity of secondary storage 521. The RAM 523 may be used to store volatile data and perhaps to store instructions. Access to both ROM 522 and RAM 523 may be faster than to secondary storage 521.

UE 500 may be any device that communicates data (e.g., packets) wirelessly with a network. The UE 500 may comprise a receiver (Rx) 512, which may be configured for receiving data, packets, or frames from other components. The receiver 512 may be coupled to the processor 520, which may be configured to process the data and determine to which components the data is to be sent. The UE 500 may also comprise a transmitter (Tx) 532 coupled to the processor 520 and configured for transmitting data, packets, or frames to other components. The receiver 512 and transmitter 532 may be coupled to an antenna 530, which may be configured to receive and transmit wireless (radio) signals.

The UE 500 may also comprise a device display 540 coupled to the processor 520, for displaying output thereof to a user. The device display 520 may comprise a light-emitting diode (LED) display, a Color Super Twisted Nematic (CSTN) display, a thin film transistor (TFT) display, a thin film diode (TFD) display, an organic light-emitting diode (OLED) display, an active-matrix OLED display, or any other display screen. The device display 540 may display in color or monochrome and may be equipped with a touch sensor based on resistive and/or capacitive technologies.

The UE 500 may further comprise input devices 541 coupled to the processor 520, which may allow the user to input commands to the UE 500. In the case that the display device 540 comprises a touch sensor, the display device 540 may also be considered an input device 541. In addition to and/or in the alternative, an input device 541 may comprise a mouse, trackball, built-in keyboard, external keyboard, and/or any other device that a user may employ to interact with the UE 500.

The UE may further comprise a visual input 560 configured to capture motion or stop photography in the visual input's 560 field of view as visual data. For example, the visual input 560 may comprise a video camera or still camera. The visual input's 560 field of view may be the extent of the observable world that may be observed by the visual input 560 at a given time. The visual input's 560 field of view may be described in terms of the UE's 500 physical location, horizontal facing, vertical facing, and/or height (e.g. above the Earth's surface, above sea level, etc.) at a given time. A physical location may be the location of a component with respect to the Earth's surface at a specified point in time (e.g. geographic location). The visual input's 560 field of view may be further described in terms of an angular field of view associated with a specific implementation of the visual input, such as the angular field of view associated with a particular camera and/or lens. The visual input 560 may be coupled to the processor 520, and may forward visual data captured in the visual input's field of view to the processor for processing, storage, transmission, and/or display. It should be noted that horizontal facing and vertical facing, as used herein, may describe the direction the visual input 560 is pointed at a given time with reference to a horizontal axis and the vertical axis, respectively.

The UE 500 may further comprise position sensors 550. Position sensors 550 may be coupled to the processor and may be configured to determine the physical location, height, vertical facing and/or horizontal facing of the UE 500 and/or of the visual input 560 (e.g. field of view data) at a given time. Position sensors 550 may comprise global position system (GPS) sensors, magnetometers, accelerometers, gyroscopes, and/or other sensors. Position sensors 550 may transmit collected field of view data to the processor 520 for determination of the visual input's 560 field of view at a specified time.

Figure 6:
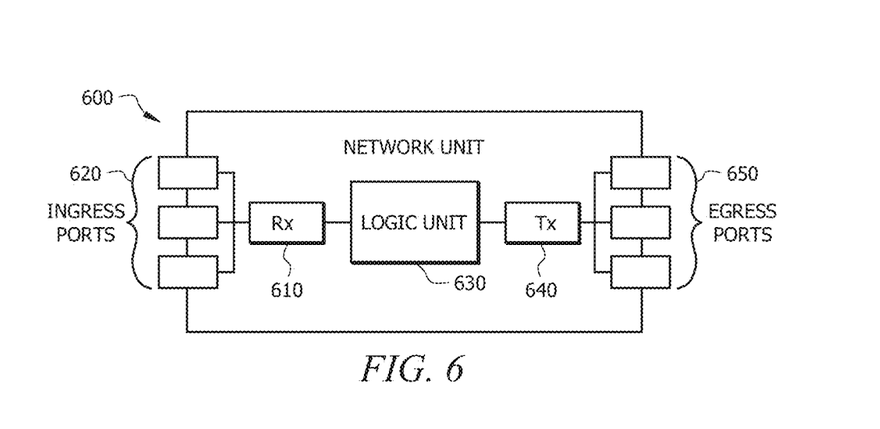
FIG. 6 is a schematic diagram of an embodiment of a NE.

FIG. 6 is a schematic diagram of an embodiment of an NE 600, which may function as a NE in network 100 and may be employed to implement a NE 130-131, a server 122, and/or an AP 121. One skilled in the art will recognize that the term NE encompasses a broad range of devices of which NE 600 is merely an example. NE 600 is included for purposes of clarity of discussion, but is in no way meant to limit the application of the present disclosure to a particular NE embodiment or class of NE embodiments. At least some of the features/methods described in the disclosure may be implemented in a network apparatus or component, such as an NE 600. For instance, the features/methods in the disclosure may be implemented using hardware, firmware, and/or software installed to run on hardware. The NE 600 may be any device that transports frames through a network, e.g., a switch, router, bridge, server, etc. As shown in FIG. 6, the NE 600 may comprise a receiver (Rx) 610 coupled to plurality of ingress ports 620 for receiving frames from other nodes, a logic unit 630 coupled to the receiver to determine which nodes to send the frames to, and a transmitter (Tx) 640 coupled to the logic unit 630 and to plurality of egress ports 650 for transmitting frames to the other nodes. The logic unit 630 may comprise one or more multi-core processors and/or memory devices, which may function as data stores. The ingress ports 620 and/or egress ports 650 may contain electrical and/or optical transmitting and/or receiving components. NE 600 may or may not be a routing component that makes routing decisions.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. The use of the term "about" means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A user equipment (UE) comprising:
   a display;
   a visual input configured to capture motion or stop photography images of a three dimensional (3D) area as visual data;
   one or more non-visual position sensors configured to determine a physical location of the UE;
   a transmitter configured to transmit a network data request message to a server;
   a receiver configured to receive network data from the server; and
   a processor coupled to the display, visual input, position sensors, orientation sensors, transmitter, and receiver and configured to:
   receive the visual data from the visual input;
   receive non-visual position data from the position sensors;
   cause the transmitter to transmit the network data request message, wherein the network data request message comprises field of view data indicating the physical location of the UE as measured by one of the position sensors and a proximity indicating that the request message is a request for data related to network elements (NEs) within a distance of the physical location of the UE as specified by a user;
   receive, via the receiver from the server, a network data response message indicating a 3D physical location of each NE within the proximity of the physical location of the UE;
   overlay network data received from the server for an obscured NE not present in the visual data of the 3D area onto the visual data of the 3D area at the 3D physical location of the obscured NE indicated by the server to create a composite image indicating the 3D physical location the obscured NE with respect to the captured image of the 3D area; and
   transmit the composite image to the display.

2. The UE of claim 1, wherein the field of view data comprises a horizontal facing of the visual input as measured by one of the position sensors, and a vertical facing of the visual input as measured by one of the position sensors.

3. The UE of claim 2, wherein the field of view data further comprises a UE height as measured by one of the position sensors.

4. The UE of claim 2, wherein the field of view data further comprises an angular field of view of the visual input.

5. The UE of claim 1, wherein the processor is further configured to accept user input that indicates a type of network data to be displayed, and wherein the network data request message comprises the type of network data to be displayed.

6. The UE of claim 1, wherein the processor is further configured to calculate a field of view of the visual input based on the field of view data, and wherein the processor overlays the network data on the visual data such that only NEs with 3D physical locations within the visual input's field of view are overlaid on the visual data to create the composite image.

7. The UE of claim 1, wherein the processor is further configured to accept user input that specifies the proximity.

8. The UE of claim 1, wherein the visual input comprises a digital video camera.

9. The UE of claim 1, wherein the visual input comprises a digital camera.

10. A method implemented in a user equipment (UE) comprising:
- receiving, by a processor, visual data of a captured image of three dimensional (3D) area from a UE visual input;
- receiving position data from one or more UE position sensors, wherein the position data indicates a physical location of the UE independent of a location of network elements (NEs) and indicates a facing of a visual input of the UE;
- transmitting a network data request to a server, wherein the network data request comprises the UE physical location and the facing of the visual input;
- receiving, from the server, network data associated with NEs with physical locations within a field of view of the visual input defined by the visual input facing and the UE physical location, wherein the NEs comprise an obscured NE not present in the visual data of the captured image of the 3D area;
- overlaying the network data of the NEs with physical locations within the field of view of the visual input onto the visual data of the captured image of the 3D area from the UE visual input to create a composite image, wherein the resulting composite image comprises the captured image of the 3D area and network data of the obscured NE not present in the captured image of the 3D area; and
- displaying the composite image via a UE display.

11. The method of claim 10, wherein network data associated with the NEs is only received for NEs with physical locations that are within a predetermined proximity of the UE.

* * * * *

UNITED STATES PATENT AND TRADEMARK OFFICE
CERTIFICATE OF CORRECTION

| | |
|---|---|
| PATENT NO. | : 9,164,552 B2 |
| APPLICATION NO. | : 13/629244 |
| DATED | : October 20, 2015 |
| INVENTOR(S) | : Yunxia Chen, Kenneth Durazzo and An Ho |

It is certified that error appears in the above-identified patent and that said Letters Patent is hereby corrected as shown below:

Title Page, (71) Applicant:
Delete "Futurewei Technologies, Co., Plano, TX (US)" and insert -- Futurewei Technologies, Inc., Plano, TX (US) --

Signed and Sealed this
Twelfth Day of July, 2016

Michelle K. Lee
*Director of the United States Patent and Trademark Office*